US012801283B2

(12) United States Patent
Kim

(10) Patent No.: US 12,801,283 B2
(45) Date of Patent: Nov. 17, 2026

(54) DATA STORAGE APPARATUS, MEMORY CONTROLLER, AND METHOD FOR MANAGING OVERLAPPING WRITES

(71) Applicant: SK hynix Inc., Gyeonggi-do (KR)

(72) Inventor: Ki Tae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 19/007,555

(22) Filed: Jan. 2, 2025

(65) Prior Publication Data

US 2026/0044262 A1 Feb. 12, 2026

(30) Foreign Application Priority Data

Aug. 6, 2024 (KR) ........................ 10-2024-0104635

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0613; G06F 3/0659; G06F 3/0673; G06F 3/0679; G06F 3/0604; G06F 3/0658; G06F 2212/1016
USPC .......................................................... 711/154
See application file for complete search history.

(56) References Cited

U.S. PATENT DOCUMENTS 10,474,390 B1 * 11/2019 Whyte ............. H03K 19/17732
11,604,735 B1 * 3/2023 Segev ................. G06F 12/0857
2013/0304998 A1 * 11/2013 Palmer .................. G06F 3/0688 711/E12.001
2014/0237164 A1 * 8/2014 Le ....................... G06F 12/0246 711/103
2015/0253992 A1 * 9/2015 Ishiguro ................ G06F 3/0611 711/103
2017/0344581 A1 * 11/2017 Lee ..................... G06F 16/1844
2018/0157437 A1 * 6/2018 Sandberg .............. G06F 3/0647
2020/0133833 A1 * 4/2020 Hughes ............... G06F 12/1441
2023/0214249 A1 * 7/2023 Bhatia ..................... G06F 3/061 718/1
2025/0251876 A1 * 8/2025 Kim ...................... G06F 3/0656
2026/0003543 A1 * 1/2026 Liu ......................... G06F 3/061

FOREIGN PATENT DOCUMENTS

KR 10-2022-0048869 A 4/2022
KR 10-2022-0138760 A 10/2022

* cited by examiner

*Primary Examiner* — Than Nguyen
(74) *Attorney, Agent, or Firm* — IP & T GROUP LLP

(57) ABSTRACT

A data storage apparatus includes a memory device and a memory controller. The memory controller is configured to determine that at least a portion of logical addresses included in adjacent write requests in a sequence of write requests continuously received from an external apparatus overlaps. The memory controller is configured to execute an overlap write mode in which deferring programming of data of an overlapping logical address.

14 Claims, 6 Drawing Sheets

DATA STORAGE APPARATUS, MEMORY CONTROLLER, AND METHOD FOR MANAGING OVERLAPPING WRITES

CROSS-REFERENCES TO RELATED APPLICATION

The present application claims priority under 35 U.S.C. § 119(a) to Korean Patent Application Number 10-2024-0104635, filed on Aug. 6, 2024, which is incorporated herein by reference in its entirety.

BACKGROUND

1. Technical Field

Various embodiments of the present disclosure may generally relate to a data storage apparatus, and more particularly, to a data storage apparatus with improved write efficiency, an operating method thereof, and a memory controller therefor.

2. Related Art

A data storage apparatus stores data in a memory device or reads data stored in the memory device and provides the read data to an external apparatus, according to a request of the external apparatus.

The performance of the data storage apparatus may be affected by speed that the memory device writes or reads data as well as techniques used by a memory controller that operates the memory device.

Therefore, there is a need for technology for writing and reading data more efficiently in response to a request from an external apparatus.

SUMMARY

In an embodiment of the present disclosure, a data storage apparatus may include a memory device and a memory controller. The memory controller may determine that at least a portion of logical addresses included in adjacent write requests in a sequence of write requests continuously received from an external apparatus overlaps; and execute, in response to a first write request including a first logical addresses received at a first timing, an overlap write mode which programs in the memory device, data of a logical address, which non-overlaps a second logical addresses included in a second write request received subsequent to the first write request at a second timing, while deferring programming data of an overlapping logical address.

In an embodiment of the present disclosure, a memory controller may include an overlap write manager. The overlap write manager may determine whether at least a portion of logical addresses included in adjacent write requests in a sequence of write requests continuously received from an external apparatus overlaps, and may defer, based on a first write request including a first logical addresses received at a first timing and a second logical addresses included in a second write request received subsequent to the first write request at a second timing, writing of data corresponding to the first logical addresses of the first write request, the data to be updated.

In an embodiment of the present disclosure, an operating method of a data storage apparatus may include determining whether at least a portion of logical addresses included in adjacent write requests in a sequence of write requests continuously received from an external apparatus, overlaps; and executing an overlap write mode in response to a determination that the at least a portion of the logical addresses overlaps; during the overlap write mode, controlling, in response to a first write request including a first logical addresses received at the first timing, data corresponding to a logical address which non-overlaps a second logical addresses included in a second write request received subsequent to the first write request at a second timing, to be programmed while deferring programming corresponding to data of a logical address of the first logical addresses, which overlaps the second logical addresses.

According to the present technology, data may be optionally written according to a pattern of a logical address to be written. Accordingly, the write operation of undesired data may be omitted and thus the performance of a data storage apparatus may be improved.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present disclosure are described in detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present disclosure as defined in the appended claims.

The present disclosure are described herein with reference to cross-section and/or plan illustrations of embodiments of the present disclosure. However, embodiments of the present disclosure should not be construed as limiting the present disclosure. Although a few embodiments of the present disclosure are shown and described, it will be appreciated by those of ordinary skill in the art that changes may be made in these embodiments without departing from the principles and spirit of the present disclosure.

Figure 1:
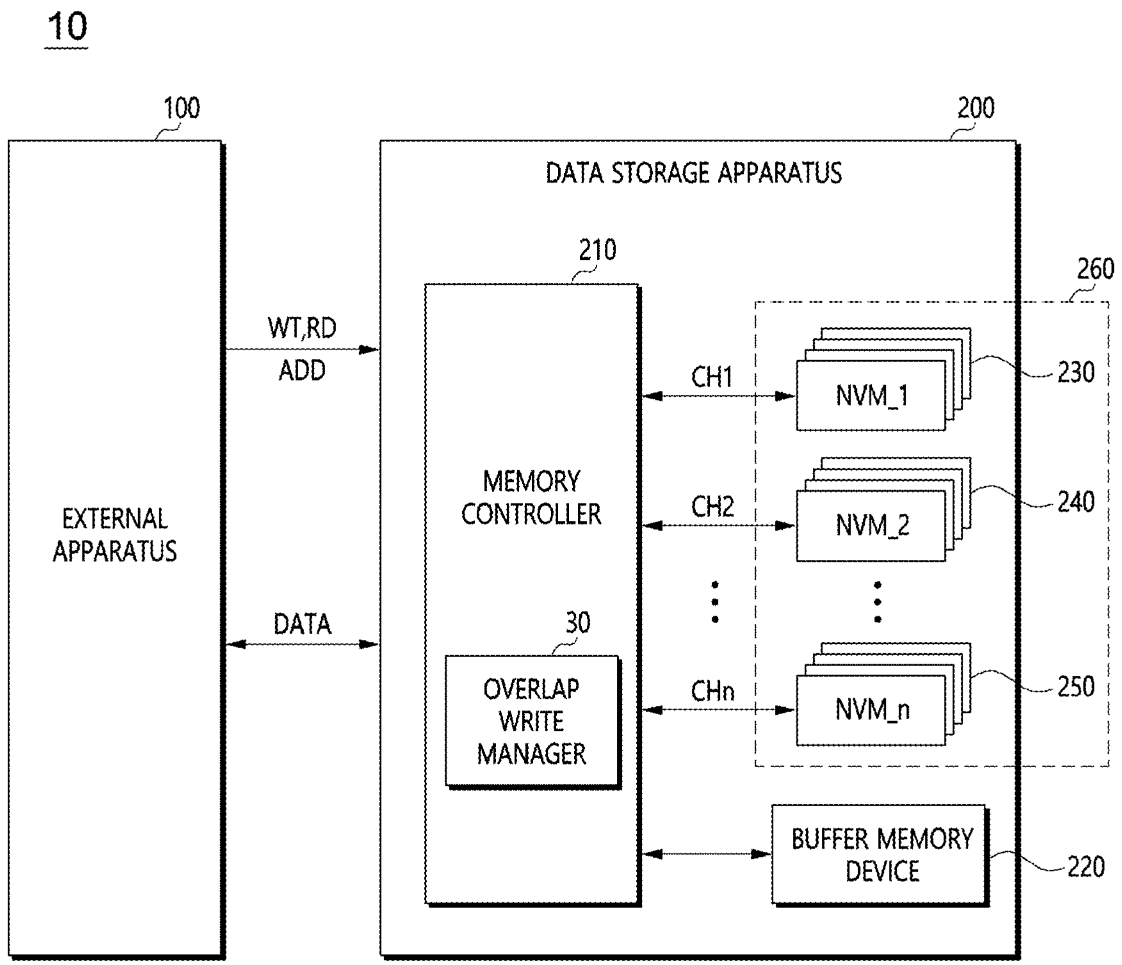
FIG. 1 is a diagram illustrating a configuration of a data processing system according to an embodiment of the present disclosure.

FIG. 1 is a diagram illustrating a data processing system 10 according to an embodiment of the present disclosure.

Referring to FIG. 1, the data processing system 10 includes an external apparatus 100 and a data storage apparatus 200.

The external apparatus 100 may include at least one processor. For example, the external apparatus 100 may be a processor itself. In another example, the external apparatus 100 may be an electronic apparatus including the processor or an electronic system including the processor. The external apparatus 100 may operate as a host apparatus for the data storage apparatus 200.

The data storage apparatus 200 includes a memory controller 210, a buffer memory device 220, and a memory device 260. The memory device 260 includes at least a plurality of nonvolatile memory devices (NVM1, NVM2, . . . , NVMn) 230, 240, and 250. The buffer memory device 220 may be optionally included in the data storage apparatus 200. For example, the data storage apparatus 200 may include the buffer memory device 220 or may not include the buffer memory device 220.

The external apparatus 100 transmits a write request including a write command WT, an address ADD, and write data DATA to the data storage apparatus 200 to store data. In response to the write request, the data storage apparatus 200 operates to program the write data DATA in the memory device 260.

The external apparatus 100 transmits a read request including a read command RD and an address ADD to the data storage apparatus 200 to read data. The data storage apparatus 200 reads read-requested data DATA from the memory device 260 and transmits the read data DATA to the external apparatus 100.

The data storage apparatus 200 may read data from the memory device 260 or write data in the memory device 260 according to the read or write request. For example, the data storage apparatus 200 may read/write the data from/in the memory device 260 according to the read/write request of the external apparatus 100. In another example, the data storage apparatus 200 may internally generate the read/write request to perform an internal management operation for managing the memory device 260 and read/write the data from/in the memory device 260 according to the internally generated read/write request. The internal management operation may include a house-keeping operation, such as a wear-leveling operation, a garbage collection operation, and a read reclaim operation, which is performed to use a storage space of the memory device 260 efficiently or to ensure reliability of data stored in the memory device 260, regardless of a request of the external apparatus 100.

The memory device 260 is coupled to the memory controller 210 through at least one channel CH1 to CHn. In an embodiment, the nonvolatile memory devices 230 to 250 may include at least one of various types of nonvolatile memory devices such as a NAND flash memory, a NOR flash memory, a ferroelectric RAM (FRAM) using a ferroelectric capacitor, a magnetic RAM (MRAM) using a tunneling magneto-resistive (TMR) layer, a phase-change RAM (PRAM) using a chalcogenide alloy, and a resistive RAM (ReRAM) using a transition metal oxide.

Each of the nonvolatile memory devices 230 to 250 may include a plurality of memory cells. Each of the memory cells may operate as a single level cell (SLC) which stores 1-bit data or a multi-level cell (MLC) which stores 2-bit or more data. Portions of the nonvolatile memory devices 230 to 250 may operate as SLC memory devices, and the remaining nonvolatile memory devices may operate as MLC memory devices. Portions of the memory cells in each of the nonvolatile memory devices 230 to 250 may operate as SLCs, and the remaining memory cells in each of the nonvolatile memory devices 230 to 250 may operate as MLCs.

The buffer memory device 220 temporarily stores data transmitted and received between the external apparatus 100 and the data storage apparatus 200 or mapdata in a write or read operation. The mapdata may be mapping information between an address (physical address) of a physical storage space constituting the memory device 260 and a logical address assigned to the memory device 260 by the external apparatus 100. The mapdata may be stored in the memory device 260, and the memory controller 210 may at least partially load and use the mapdata required for the operation of the data storage apparatus 200 into the buffer memory device 220 or an internal memory (not shown) of the memory controller 210.

The memory controller 210 may include an overlap write manager 30.

The overlap write manager 30 may perceive a pattern of a write logical address included in a write request. The overlap write manager 30 may detect an overlap write pattern that at least a portion of logical addresses of write requests, which are temporally adjacently received, overlaps. When the overlap write pattern is detected, with respect to the previous write request, the overlap write manager 30 may program write data of a logical address, which non-overlaps a logical address of a write request which is received later than the previous write request, in the memory device 260 and defer programming of write data of an overlapping logical address.

In another aspect, the overlap write manager 30 may defer writing of data expected to be updated among a plurality of pieces of write data included in one write request.

Figure 2:
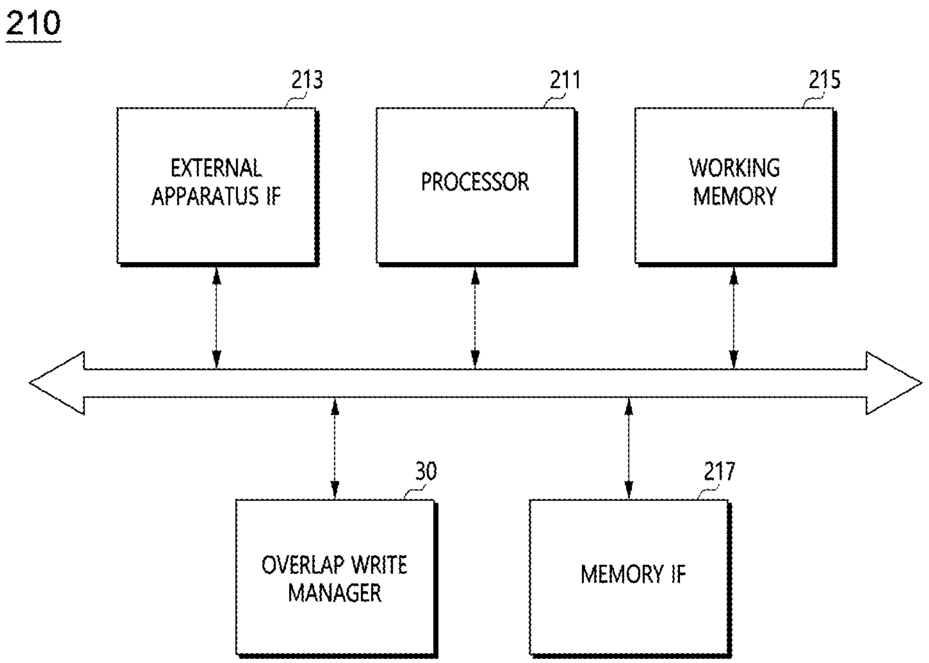
FIG. 2 is a diagram illustrating a configuration of a memory controller according to an embodiment of the present disclosure.

FIG. 2 is a diagram illustrating a configuration of a memory controller 210 according to an embodiment of the present disclosure.

Referring to FIG. 2, the memory controller 210 according to an embodiment includes a processor 211, an external apparatus interface (IF) 213, a working memory 215, a memory IF 217, and the overlap write manager 30.

The processor 211 may operate as firmware or software, which is executed on hardware and provided for various operations of the memory controller 210. The processor 211 may be implemented in a combined form of hardware and firmware or software which operates on the hardware. In an embodiment, the processor 211 may include a write circuit configured to control the memory device 260 to program data write-requested by the external apparatus 100. The processor 211 may include a read circuit configured to control the memory device 260 to read data read-requested by the external apparatus 100 and provide the read data to the external apparatus 100. The write circuit and the read circuit may operate in series or in parallel. The processor 211 may perform a function of a flash translation layer FTL, which manages the data storage apparatus 200, and the like.

The external apparatus IF 213 may receive a request and a clock signal from the external apparatus 100 according to control of the processor 211 and provide a communication channel for controlling input and output of data. In particular, the external apparatus IF 213 may provide a physical connection between the external apparatus 100 and the data storage apparatus 200

In an embodiment, the external apparatus IF 213 may communicate with the external apparatus 100 based on an interface using at least one of various communication interfaces or standards, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial advanced technology attachment (SATA) protocol, a parallel advanced technology attachment (PATA) protocol, a small computer system interface (SCSI) protocol, an enhanced small disk interface (ESDI) protocol, an integrated drive electronics (IDE) protocol, a private protocol, a system management bus (SMBus) protocol, an inter-integrated circuit (I2C) protocol, and an improved inter-integrated circuit (I3C) protocol.

The external apparatus IF 213 may code and store a request included in a request received from the external apparatus 100. In response to the write request of the external apparatus 100, the external apparatus IF 213 may store the write data provided from the external apparatus 100 in the buffer memory device 220 according to control of the processor 211. The write data stored in the buffer memory device 220 may be transmitted and programmed to and in the memory device 260 according to control of the processor 211. In response to the read request of the external apparatus 100, the external apparatus IF 213 may provide the read data, which is read from the memory device 260 and stored in the buffer memory device 220, to the external apparatus 100 according to control of the processor 211. When the buffer memory device 220 is not included in the data storage apparatus 200, the write data and the read data may be transmitted and received from and to the external apparatus 100 via the working memory 215.

The working memory 215 may be configured of a random access memory (RAM) device such as a dynamic RAM (DRAM) or a static RAM (SRAM). The working memory 215 may store firmware driven by the processor 211. Further, the working memory 215 may store data required for driving the firmware, for example, metadata. The metadata may be stored in the memory device 260, and the processor 211 may load and use the metadata required for the operation of the data storage apparatus 200 into the working memory 215.

Further, the working memory 215 may operate as a buffer memory configured to store the write data provided from the external apparatus 100 and the read data read from the memory device 260.

The memory IF 217 may provide a communication channel for signal transmission/reception between the memory controller 210 and the memory device 260. The memory IF 217 may transmit data temporarily stored in the buffer memory device 220 to the memory device 260 according to control of the processor 211. The memory IF 217 may transmit read data read from the memory device 260 to the buffer memory device 220 to be temporarily stored therein according to control of the processor 211.

The overlap write manager 30 may determine whether or not at least a portion of logical addresses included in write requests, which are adjacently received in time from the external apparatus 100, overlaps. The overlap write manager 30 may enable an overlap write mode based on the number of times it is determined that the at least a portion of the logical addresses overlaps.

When the overlap write mode is enabled, with respect to the previously received write request, the overlap write manager 30 may generate a program command for programming write data of a logical address, which non-overlaps a logical address of a write request temporally received later than the previously received write request, to control the memory device 260. When the overlap write mode is enabled, with respect to the previously received write request, the overlap write manager 30 may defer programming of write data of a logical address which overlaps the logical address of the write request temporally received later than the previously received write request.

In an embodiment, the overlap write manager 30 may disable the overlap write mode when a logical address of a currently received write request non-overlaps a logical address of a previously received write request in a state that the overlap write mode is enabled.

In an embodiment, the overlap write manager 30 may disable the overlap write mode when another request other than the write request is received from the external apparatus 100 after the overlap write mode is enabled.

Figure 3:
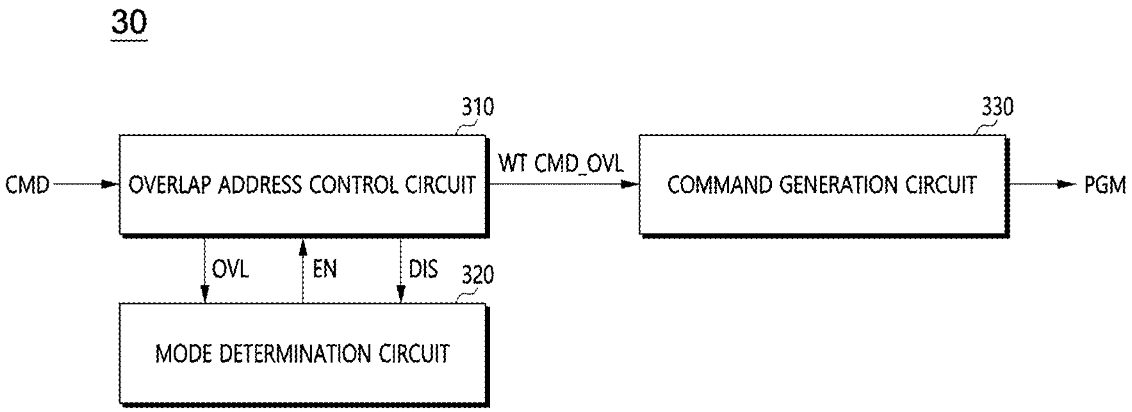
FIG. 3 is a diagram illustrating a configuration of an overlap write manager according to an embodiment of the present disclosure.

FIG. 3 is a diagram illustrating a configuration of an overlap write manager 30 according to an embodiment of the present disclose.

Referring to FIG. 3, the overlap write manager 30 includes an overlap address control circuit 310, a mode determination circuit 320, and a command generation circuit 330.

The overlap address control circuit 310 may extract a logical address from a write request received from the external apparatus 100. The overlap address control circuit 310 may compare logical addresses included in temporally adjacent write requests, for example, a logical address of a previously received write request and a logical address of a currently received write request and determine whether or not at least a portion of the logical addresses overlaps according to a comparison result. When the at least a portion of the logical addresses overlaps, the overlap address control circuit 310 may transmit an overlap signal OVL to the mode determination circuit 320.

In an embodiment, the overlap address control circuit 310 may discriminate the address overlapping for sequential write requests that a plurality of logical addresses are included in one write command, but this is not limited thereto.

For example, the write requests including the write commands are sequentially received as shown in the following Table 1.

TABLE 1

| |
|---|
| WT CMD0: Start LA: 0, LA count: 2 |
| WT CMD1: Start LA: 1, LA count: 2 |
| WT CMD2: Start LA: 2, LA count: 2 |
| WT CMD3: Start LA: 3, LA count: 2 |

A write command 0 WT CMD0 is a write command for two consecutive logical addresses LA0 and LA1 starting with a leading logical address LA0, and in the write command 0 WT CMD0, a last logical address is LA1.

A write command 1 WT CMD1 is a write command for two consecutive logical addresses LA1 and LA2 starting with a leading logical address LA1, and in the write command 1 WT CMD1, a last logical address is LA2.

A write command 2 WT CMD2 is a write command for two consecutive logical addresses LA2 and LA3 starting with a leading logical address LA2, and in the write command 2 WT CMD2, a last logical address is LA3.

A write command 3 WT CMD3 is a write command for two consecutive logical addresses LA3 and LA4 starting with a leading logical address LA3, and in the write command 3 WT CMD3, a last logical address is LA4.

When the write command 1 WT CMD1 is received, the overlap address control circuit 310 determines whether or not at least a portion of the logical addresses LA0 and LA1 of the previously received write command 0 WT CMD0 overlaps the logical addresses LA1 and LA2 of the currently received write command 1 WT CMD1. The logical address LA1 overlaps, and thus the overlap address control circuit 310 transmits the overlap signal OVL to the mode determination circuit 320.

When the write command 2 WT CMD2 is received, the overlap address control circuit 310 determines whether or not at least a portion of the logical addresses LA1 and LA2 of the previously received write command 1 WT CMD1 overlaps the logical addresses LA2 and LA3 of the currently received write command 2 WT CMD2. The logical address LA2 overlaps, and thus the overlap address control circuit 310 transmits the overlap signal OVL to the mode determination circuit 320.

When the write command 3 WT CMD3 is received, the overlap address control circuit 310 determines whether or not at least a portion of the logical addresses LA2 and LA3 of the previously received write command 2 WT CMD2 overlaps the logical addresses LA3 and LA4 of the currently received write command 3 WT CMD3. The logical address LA3 overlaps, and thus the overlap address control circuit 310 transmits the overlap signal OVL to the mode determination circuit 320.

Even in case of sequential write requests that three logical addresses are included in one write command as shown in the following Table 2, the overlap address control circuit 310 may determine the overlapping of the logical addresses as described above.

TABLE 2

| |
|---|
| WT CMD10: Start LA: 0, LA count: 3 |
| WT CMD11: Start LA: 1, LA count: 3 |
| WT CMD12: Start LA: 2, LA count: 3 |
| WT CMD13: Start LA: 3, LA count: 3 |

In an embodiment, the overlap address control circuit 310 may determine that the logical address overlaps when the leading address of the current logical addresses is equal to or less than the last logical address of the previous logical addresses.

The overlap address control circuit 310 may expect a position of a logical address to be overlapped, based on a pattern of the logical addresses of the previously received write command and the logical addresses of the currently received write command. In an embodiment, the overlap address control circuit 310 may determine the position of the overlapping logical address between the logical addresses of the adjacent write commands to expect an overlapping position. The position of the logical address may refer to the position according to an order of the plurality of logical addresses included in the one write command.

For example, when the write commands as shown in Table 1 are received, the overlap address control circuit 310 may expect that the last logical address of the previously received write command overlaps the leading logical address of the currently received write command. For example, when the write commands as shown in Table 2 are received, the overlap address control circuit 310 may expect that two last logical addresses of the previously received write command overlap two leading logical addresses of the currently received write command.

The mode determination circuit 320 may count the number of times the overlap signal OVL is received as the overlap signal OVL is transmitted from the overlap address control circuit 310. The mode determination circuit 320 may transmit an overlap write mode enable signal EN to the overlap address control circuit 310 when the overlap signal OVL count is equal to or greater than a set threshold value.

As the overlap write mode is enabled, the overlap address control circuit 310 may select a logical address, which non-overlaps the logical addresses of the currently received write command, among the logical addresses included in the previous write command which is received earlier than the currently received write command and is not yet processed, to generate an overlap write command WT CMD_OVL.

The command generation circuit 330 may generate a program command PGM based on the overlap write command WT CMD_OVL and transmit the program command PGM to the memory device 260.

After the overlap write mode is enabled, the overlap address control circuit 310 may monitor the command CMD received from the external apparatus 100.

Logical addresses included in a write request, which is received from the external apparatus 100 after the overlap write mode is enabled, may non-overlap the logical addresses included in the previously received write request. In this case, the overlap address control circuit 310 may transmit an overlap write mode disable signal DIS to the mode determination circuit 320.

After the overlap write mode is enabled, a request other than the write request, for example, including a read command, a manager command of the external apparatus 100, a management command corresponding to power loss of the external apparatus 100, a reset command, and an error processing-related command may be received from the external apparatus 100. In this case, the overlap address control address 310 may transmit the overlap write mode disable signal DIS to the mode determination circuit 320.

When the overlap write mode is disabled, the overlap address control circuit 310 may generate the overlap write command WT CMD_OVL for the programming-deferred logical address.

The command generation circuit 330 may generate the program command PGM based on the overlap write command WT CMD_OVL and transmit the program command PMG to the memory device 260.

In the present technology, the overlap write manager 30 may enable the overlap write mode when an overlapping count of the logical addresses, which are included in the adjacent write requests in a sequence of the write requests received from the external apparatus 100, is equal to or greater than a set threshold value. When the write operation is performed without a process for checking whether the logical addresses included in the adjacently received write requests overlap, a write amplification factor (WAF=amount of data actually written in the memory device/amount of data write-requested by the external apparatus) is increased due to the undesired write operation, and thus the performance of the data storage apparatus 200 is deteriorated.

As in the present technology, after it is determined that the address overlapping count is equal to or greater than the set threshold value and then the overlap write mode is enabled, WAF is reduced. WAF may be collected, for example, through self-monitoring, analysis and reporting technology (S.M.A.R.T) information, and it can be seen that after the overlap write mode is enabled, WAF is reduced.

Further, in a state that the overlap write mode is disabled, the write-requested data may be flushed to the memory device 260 to ensure data consistency.

When the program operation for the data of the overlapping logical address is deferred without a process for checking whether or not the address overlapping count is equal to or greater than the set threshold value, because it cannot be seen that which address is to be overlapped, the write data may be continuously retained in the buffer memory device 220 and whenever the write request is received, the whole of the buffer memory device 220 may be searched to detect the overlapping logical address.

The present technology may determine the position of the logical address which overlaps between the logical addresses of the adjacent write requests to expect the overlapping position of the logical address included in a subsequent write request. Accordingly, the programming of the data related to the logical address expected to be overlapped may be optionally deferred.

Figure 4:
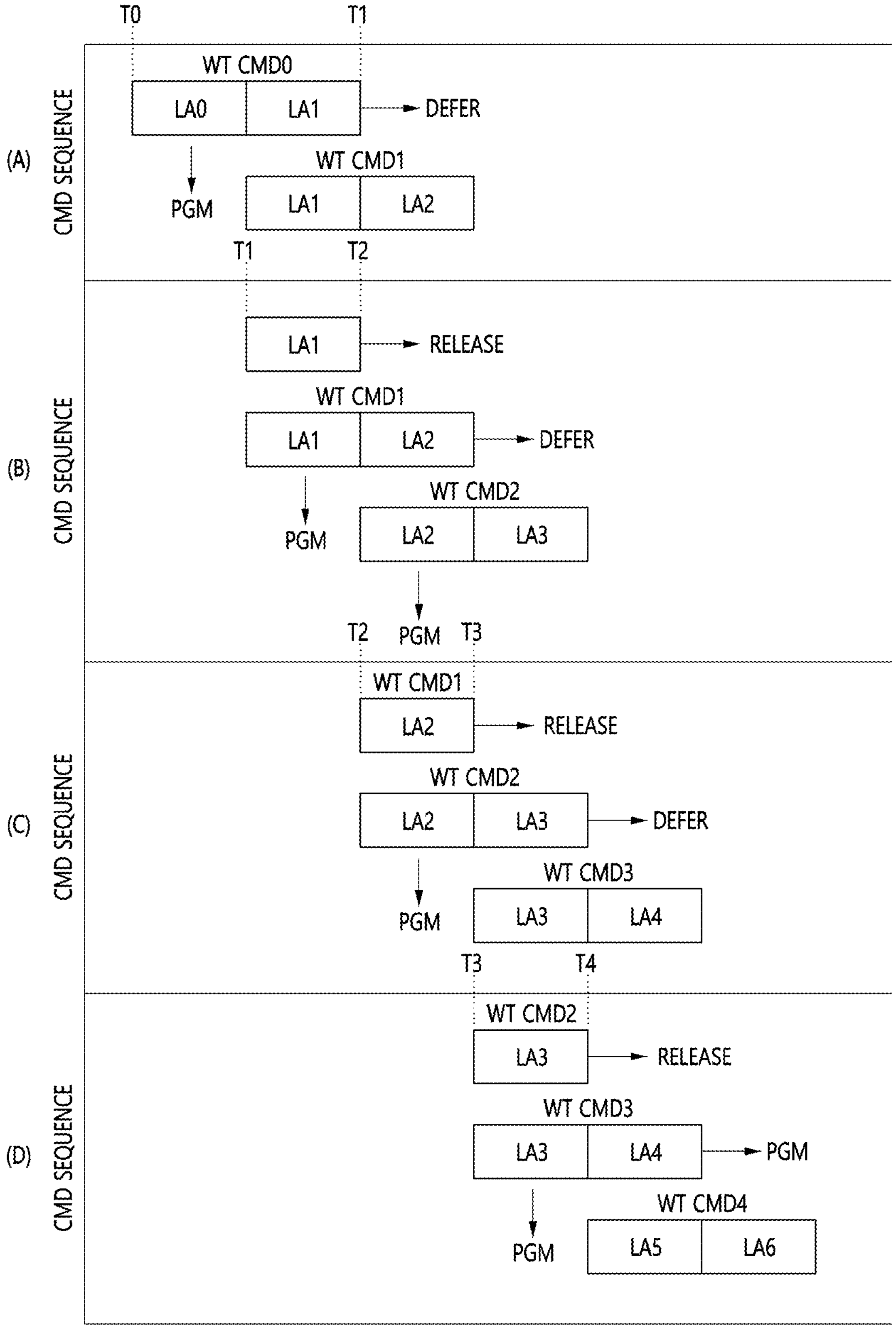
FIG. 4 is a diagram for describing an operation of an overlap write manager according to an embodiment of the present disclosure.

FIG. 4 is a conceptual diagram for describing an operation of an overlap write manager 30 according to an embodiment of the present disclosure.

The overlap write manager 30 may determine whether or not at least a portion of the adjacent logical addresses LA in a sequence of consecutive write requests overlaps.

When the write command 0 WT CMD0 including the logical addresses LA0 and LA1 is received at timing TO, the overlap write mode is enabled, and the overlapping position is expected as the last logical address of the previously received write command.

Referring to (A) of FIG. 4, the overlap write manager 30 may determine that at least a portion of the logical addresses LA0 and LA1 of the write command 0 WT CMD0, which is received earlier at the timing TO, overlaps at least a portion of the logical addresses LA1 and LA2 of the write command 1 WT CMD1 which is received at timing T1 later than the timing TO. With respect to the previous write command 0 WT CMD0, the overlap write manager 30 may control the memory device 260 to program PGM the write data for the logical address LA0 which non-overlaps the logical addresses of the write command 1 WT CMD1 and defer the programming for the overlapping logical address LA1.

Referring to (B) of FIG. 4, the overlap write manager 30 may determine that at least a portion of the logical addresses LA1 and LA2 of the write command 1 WT CMD1, which is early received at the timing T1, overlaps at least a portion of the logical addresses LA2 and LA3 of the write command 2 WT CMD2 which is received at timing T2 later than the timing T1. The write data of the programming-deferred logical address LA1 of the write command 1 WT CMD1 may be updated as data corresponding to the logical address LA2 of the write command 2 WT CMD2, and thus the overlap write manager 30 may release the buffer memory region allocated to the write data of the programming-deferred logical address LA1 of the write command 1 WT CMD1.

With respect to the previous write command 1 WT CMD1, the overlap write manager 30 may control the memory device 260 to program the write data for the logical address LA1 which non-overlaps the logical addresses of the current write command 2 WT CMD2 and defer the programming for the overlapping logical address LA2. In a workload having a write pattern that the logical address overlaps, the write data of the logical address LA1 included in the write command 0 WT CMD0 may be updated by the write command 1 WT CMD1, and thus the write data of the logical address LA1 may be maintained as the latest state even without the programming of the write data for the logical address LA1 included in the write command 0 WT CMD0 before updating.

Referring to (C) of FIG. 4, the overlap write manager 30 may determine that at least a portion of the logical addresses LA2 and LA3 of the write command 2 WT CMD2 received at the timing T2 overlaps at least a portion of the logical addresses LA3 and LA4 of the write command 3 WT CMD3 received at timing T3. The overlap write manager 30 may release the buffer memory region allocated to the write data of the programming-deferred logical address LA2 of the write command 1 WT CMD1. With respect to the previous write command 2 WT CMD2, the overlap write manager 30 may control the memory device 260 to program the write data for the logical address LA2 which non-overlaps the logical addresses of the current write command 3 WT CMD3 and defer the programming for the overlapping logical address LA3. The write data of the logical address LA2 may be updated by the write command 2 WT CMD2, and thus the write data of the logical address LA2 of the write command 1 WT CMD1 may be maintained as the latest state even without the programming of the write data for the logical address LA2 included in the write command 1 WT CMD1 before updating.

Referring to (D) of FIG. 4, the overlap write manager 30 may determine that at least a portion of the logical addresses LA3 and LA4 of the write command 3 WT CMD3 received at the timing T3 non-overlaps at least a portion of the logical addresses LA5 and LA6 of the write command 4 WT CMD4 received at timing T4. In response to the determination result, the overlap write manager 30 may disable the overlap write mode.

The overlap write manager 30 may release the buffer memory region allocated to the write data of the programming-deferred logical address LA3 of the write command 2 WT CMD2. With respect to the previous write command 3 WT CMD3, the overlap write manager 30 may control the memory device 260 to program PGM the write data for the logical addresses LA3 and LA4 which non-overlap the logical addresses of the current write command 4 WT CMD4.

Although not shown, the program operation for the write command 4 WT CMD4 including the logical addresses LA5 and LA6 may also be performed by the processor 211.

Figure 5:
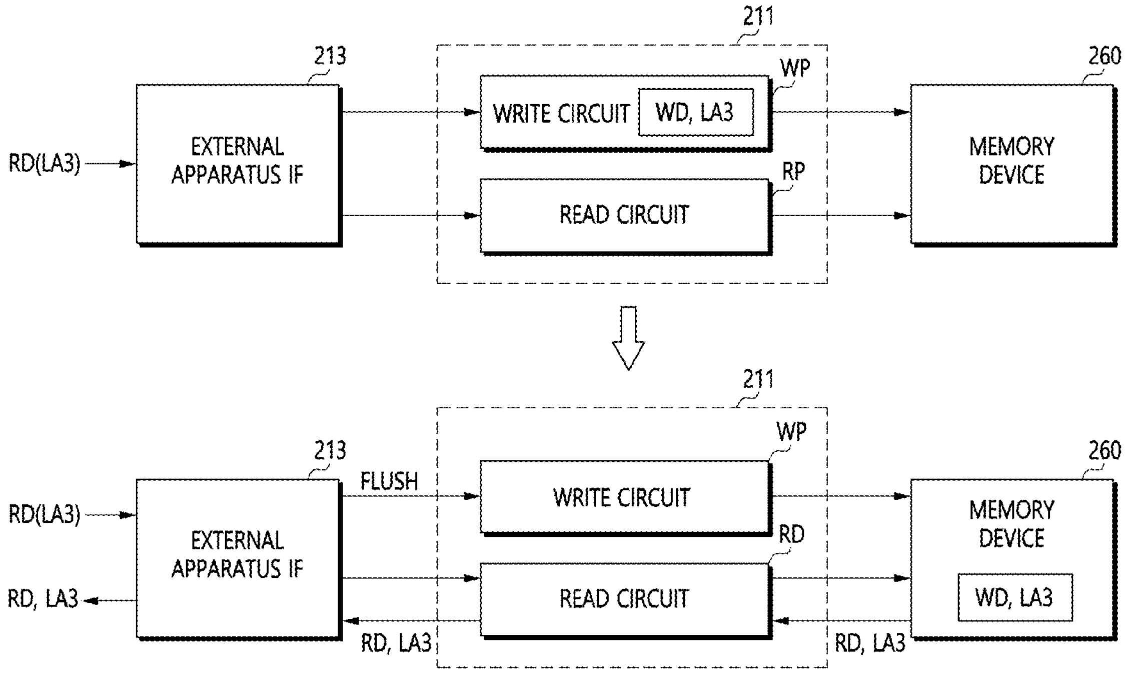
FIG. 5 is a conceptual diagram for describing overlap write mode management according to an embodiment of the present disclosure.

FIG. 5 is a conceptual diagram for describing overlap write mode management according to an embodiment of the present disclosure.

Referring to FIG. 5, the processor 211 may include a write circuit WP and a read circuit RP which operate in parallel. The processor 211 may process the write data and the read data in parallel.

During processing of the write data in a state that the overlap write mode is enabled, the programming of write data WD, LA3 for the logical address LA3 may be deferred and the write data WD, LA3 may be left in the write circuit WP.

While the programming of write data WD, LA3 for the logical address LA3 is deferred, a read command RD (LA3) for the logical address LA3 may be received from the external apparatus 100. Because the command other than the write command is received, the overlap write mode may be disabled.

Because the write data WD, LA3 for the logical address LA3 is not yet programmed in the memory device 260, data read from the memory device 260 through the read circuit RP, which operates in parallel with the write circuit WP, according to the read command RD (LA3) may be different from the write data WD, LA3 which is left in the write circuit WP.

Because the write data WD, LA3 is left in the write circuit WP, when the read command RD (LA3) is received before a program completion signal is transmitted to the external apparatus 100, the external apparatus IF 213 may issue a flush command FLUSH. The processor 211 may control the write data WD, LA3 left in the write circuit WP to be flushed to the memory device 260 in response to the flush command FLUSH. Then, the processor 211 may transmit the read command RD (LA3) to the memory device 260 through the read circuit RP, read the data RD, LA3 corresponding to the logical address LA3 from the memory device 260, and transmit the read data RD, LA3 to the external apparatus 100.

Figure 6:
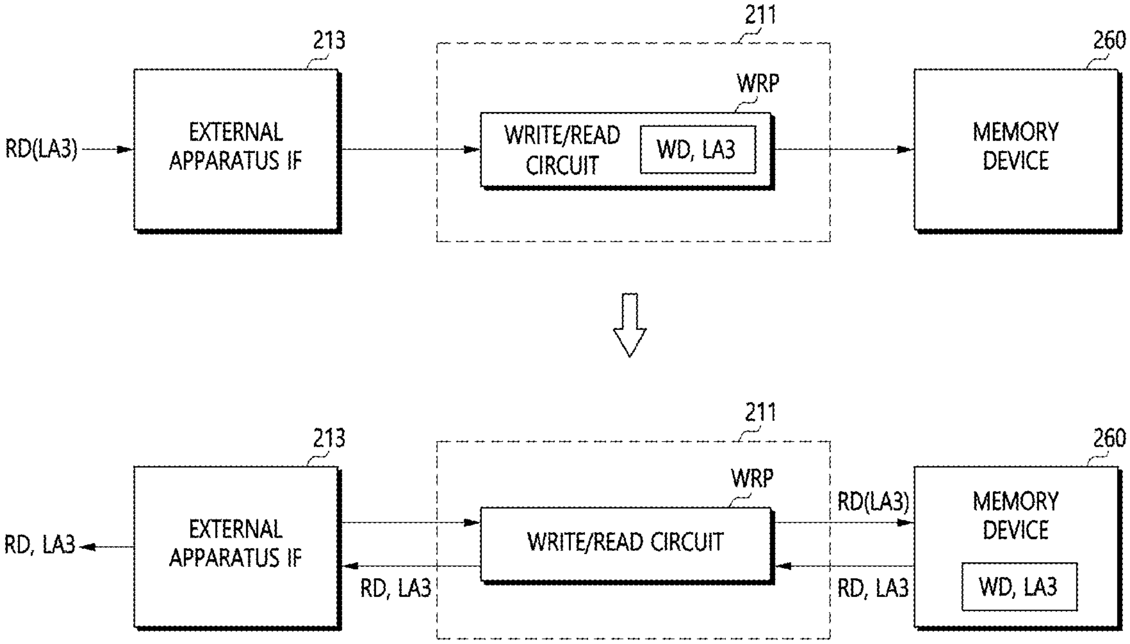
FIG. 6 is a conceptual diagram for describing overlap write mode management according to an embodiment of the present disclosure.

FIG. 6 is a conceptual diagram for describing overlap write mode management according to an embodiment of the present disclosure.

Referring to FIG. 6, the processor 211 may include a write/read circuit WRP which operates in series. The processor 211 may process the write data and the read data in series.

During processing of the write data in a state that the overlap write mode is enabled, the programming of the write data WD, LA3 for the logical address LA3 may be deferred and the write data WD, LA3 may be left in the write circuit WP.

While the programming of write data WD, LA3 for the logical address LA3 is deferred, the read command RD (LA3) for the logical address LA3 may be received from the external apparatus 100. The command other than the write command is received, and thus the overlap write mode may be disabled.

Because the write data WD, LA3 is left in the write/read circuit WRP, when the read command RD (LA3) is received before the program completion signal is transmitted to the external apparatus 100, the write/read circuit WRP may allow the left write data WD, LA3 to be programmed in the memory device 260 and then process the read command RD (LA3). For example, when the write and read commands are processed in series, the write data WD, LA3, which is not yet processed when the read command RD (LA3) is received, may be preferentially programmed in the memory device 260 even without the separate flush command FLUSH, and then the read command RD (LA3) may be processed.

As the read command RD (LA3) is processed, the data RD, LA3 read from the memory device 260 may be transmitted to the external apparatus 100.

Figure 7:
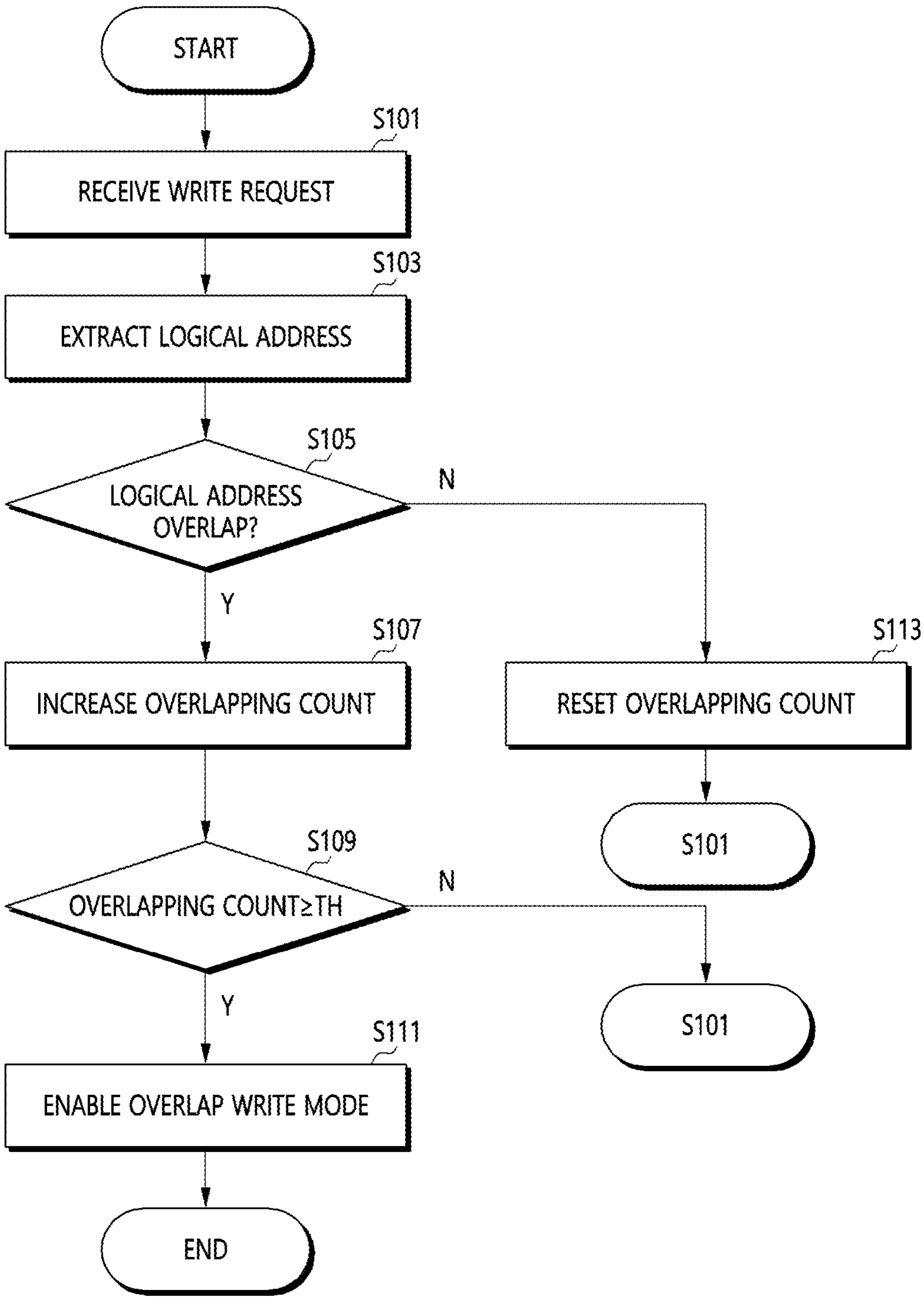
FIG. 7 is a flowchart for describing an operating method of a data storage apparatus according to an embodiment of the present disclosure.

FIG. 7 is a flowchart for describing an operating method of a data storage apparatus 200 according to an embodiment of the present disclosure.

Referring to FIG. 7, the memory controller 210 including the overlap write manager 30 monitors whether a write request is received from the external apparatus 100. When the write request is received (S101), the memory controller 210 may extract a logical address included in the write request (S103).

The memory controller 210 compares logical addresses included in write requests adjacent in time, for example, logical addresses of a previously received write request and logical addresses of a currently received write request to determine whether or not at least a portion of the logical addresses overlaps (S105).

In an embodiment, the overlap address control circuit 310 determines overlapping between the logical addresses with respect to the sequential write requests in which a plurality of logical addresses are included in one write command, but this is not limited thereto.

The memory controller 210 increases an overlapping count (S107) when it is determined that the at least a portion of the logical addresses overlaps (S105: Y).

The memory controller 210 compares the increased overlapping count and a set threshold value TH (S109). When it is determined that the overlapping count is equal to or greater than the threshold value TH (109: Y), the memory controller 210 enables the overlap write mode (S111).

When it is determined that the logical address non-overlaps (S105: N), the memory controller 210 resets the overlapping count (S113) and monitors whether the write request is received (S101).

When it is determined that the overlapping count is less than the threshold value TH (S109: N), the memory controller 210 monitors whether the write request is received (S101).

Figure 8:
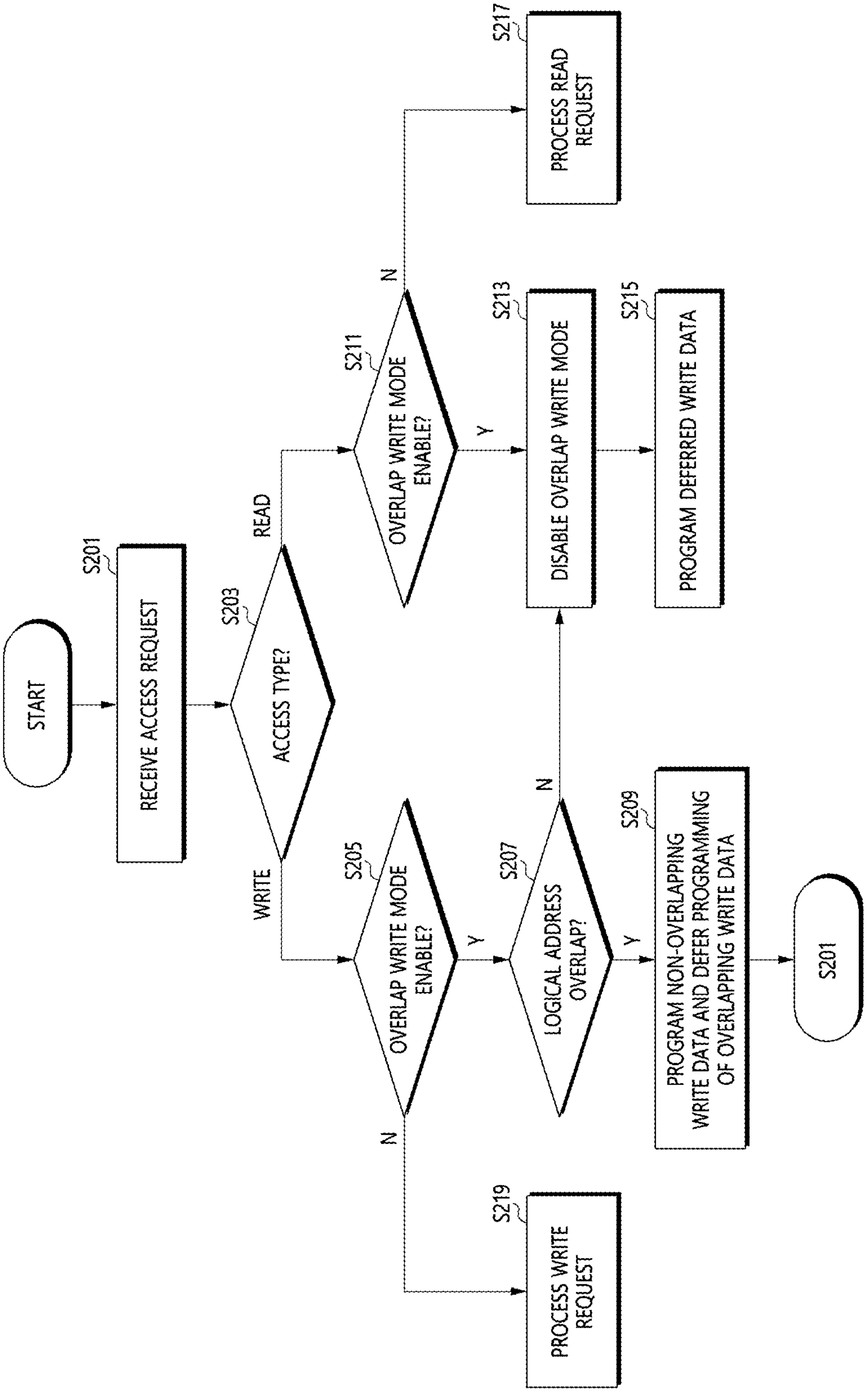
FIG. 8 is a flowchart for describing an operating method of a data storage apparatus according to an embodiment of the present disclosure.

FIG. 8 is a flowchart for describing an operating method of a data storage apparatus 200 according to an embodiment of the present disclosure.

The memory controller 210 monitors whether an access request is received from the external apparatus 100. When the access request is received (S201), the memory controller 210 checks an access type (S203).

When the access type is a write request as a determination result in S203, the memory controller 210 determines whether or not the overlap write mode is enabled (S205). When it is determined that the overlap write mode is enabled (S205: Y), the memory controller 210 compares logical addresses of a previously received write request and logical addresses of a currently received write request to determine whether or not at least a portion of the logical addresses overlaps (S207).

When it is determined that the logical address overlaps (S207: Y), the memory controller 210 programs, with respect to the previous write request, write data of a logical address which non-overlaps a logical address included in the current write request in the memory device 260 and defers the programming for an overlapping logical address (S209). Then, the memory controller 210 monitors whether the access request is received from the external apparatus 100 (S201).

When the access type is a read request as a determination result in S203, the memory controller 210 determines whether or not the overlap write mode is enabled (S211). When it is determined that the overlap write mode is enabled (S211: Y), the memory controller 210 disables the overlap write mode (S213) and programs the programming-deferred write data in the memory device 260 (S215).

When it is determined that the overlap write mode is not enabled (S211: N), the memory controller 210 processes the read request of the external apparatus 100 (S217).

When it is determined that the overlap write mode is not enabled (S205: N), the memory controller 210 processes the write request of the external apparatus 100 (S219).

When one page constituting the memory device 260 is configured of a plurality of sectors (corresponding to unit logical address), the rewrite operation for one sector causes rewrite for the entire sectors. For example, when the entire sectors are rewritten in a state that the write requests in which the logical address overlaps are received, WAF is increased.

In the present disclosure, the programming of data for the logical address, which is expected to be updated, is deferred and the programming-deferred data is programmed after updating, and thus WAF is reduced.

The above described embodiments of the present disclosure are intended to illustrate and not to limit the present invention. Various alternatives and equivalents are possible. The invention is not limited by the embodiments described herein. Nor is the invention limited to any specific type of semiconductor device. Other additions, subtractions, or modifications which are apparent in view of the present disclosure are intended to fall within the scope of the appended claims. Furthermore, the embodiments may be combined to form additional embodiments.

What is claimed is:

1. A data storage apparatus comprising:
- a memory device; and
- a memory controller configured to
  - store write data in a buffer memory device in response to a write request including logical addresses and the write data,
  - determine that at least a portion of logical addresses included in adjacent write requests in a sequence of write requests continuously received from an external apparatus overlaps,
  - execute, in response to a first write request including first logical addresses and a first write data received at a first timing, an overlap write mode in which the first write data corresponding to a logical address, which non-overlaps second logical addresses included in a second write request received subsequent to the first write request at a second timing, is programmed in the memory device from the buffer memory device while deferring programming data of an overlapping logical address, and
  - release a buffer memory region of the buffer memory device allocated to the first write data corresponding to the overlapping logical address.

2. The data storage apparatus of claim 1, wherein the memory controller is configured to determine whether the at least a portion of the logical addresses overlaps when each write request includes a plurality of logical addresses.

3. The data storage apparatus of claim 1, wherein the memory controller determines that the at least a portion of the logical addresses overlaps when a leading address of the second logical addresses is equal to or less than a last address of the first logical addresses.

4. The data storage apparatus of claim 1, wherein the memory controller is configured to enable and execute the overlap write mode when the at least a portion of the logical addresses overlaps, and disable the overlap write mode when a request other than the write requests is received from the external apparatus.

5. The data storage apparatus of claim 4, wherein the request other than the write requests includes at least one of a read command, a manager command of the external apparatus, a management command corresponding to power loss of the external apparatus, a reset command, and a command related to error processing.

6. The data storage apparatus of claim 1, wherein, when a read command is received from the external apparatus while executing the overlap write mode, the memory controller is configured to program programming-deferred data, and execute the read command.

7. A memory controller comprising:
- an overlap write manager configured to:
- store write data in a buffer memory device in response to a write request including logical addresses and the write data,
- determine whether at least a portion of logical addresses included in adjacent write requests in a sequence of write requests continuously received from an external apparatus overlaps;
- defer, based on a first write request including a first logical addresses and a first write data received at a first timing and a second logical addresses included in a second write request received subsequent to the first write request at a second timing, writing the first write data to be updated among the first write data corresponding to the first logical addresses of the first write request, and
- release a buffer memory region of the buffer memory device allocated to the first write data which writing is deferred.

8. The memory controller of claim 7, wherein, when a read command is received from the external apparatus, the memory controller is configured to program writing-deferred data, and execute the read command.

9. An operating method of a data storage apparatus, the operating method comprising:
- storing, by a controller, write data in a buffer memory device in response to a write request including logical addresses and the write data;
- determining, by the controller, whether at least a portion of logical addresses included in adjacent write requests in a sequence of write requests continuously received from an external apparatus, overlaps;
- executing, by the controller, an overlap write mode in response to a determination that the at least a portion of the logical addresses overlaps;
- during the overlap write mode, controlling, in response to a first write request including a first logical addresses and a first write data received at the first timing, the first write data corresponding to a logical address which non-overlaps second logical addresses included in a second write request received subsequent to the first write request at a second timing, to be programmed to a memory device from the buffer memory device while deferring programming data corresponding to a logical address of the first logical addresses, which overlaps the second logical addresses; and
- releasing, by the controller, a buffer memory region of the buffer memory device allocated to the first write data corresponding to an overlapping logical address.

10. The operating method of claim 9, wherein determining whether or not the at least a portion of the logical addresses overlaps when one each write request includes a plurality of logical addresses.

11. The operating method of claim 9, wherein the determining comprises determining whether a leading address of the second logical addresses is equal to or less than a last address of the first logical addresses.

12. The operating method of claim 9, wherein executing the overlap write mode comprises:
- enabling and executing the overlap write mode in response to the determination that the at least a portion of the logical addresses overlaps; and
- disabling the overlap write mode in response to a request other than the write requests received from the external apparatus.

13. The operating method of claim 12, wherein the request other than the write request includes at least one of a read command, a manager command of the external apparatus, a management command corresponding to power loss of the external apparatus, a reset command, and a command related to error processing.

14. The operating method of claim 9, further comprising:

receiving a read command from the external apparatus while executing the overlap write mode;

programing programming-deferred data; and executing the read command.

* * * * *